June 30, 1942.  W. O. WHITE  2,288,506
WATER TIGHT THREADLESS CONNECTOR
Filed Aug. 30, 1940
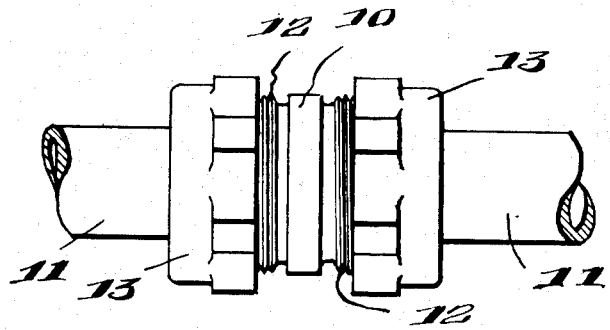
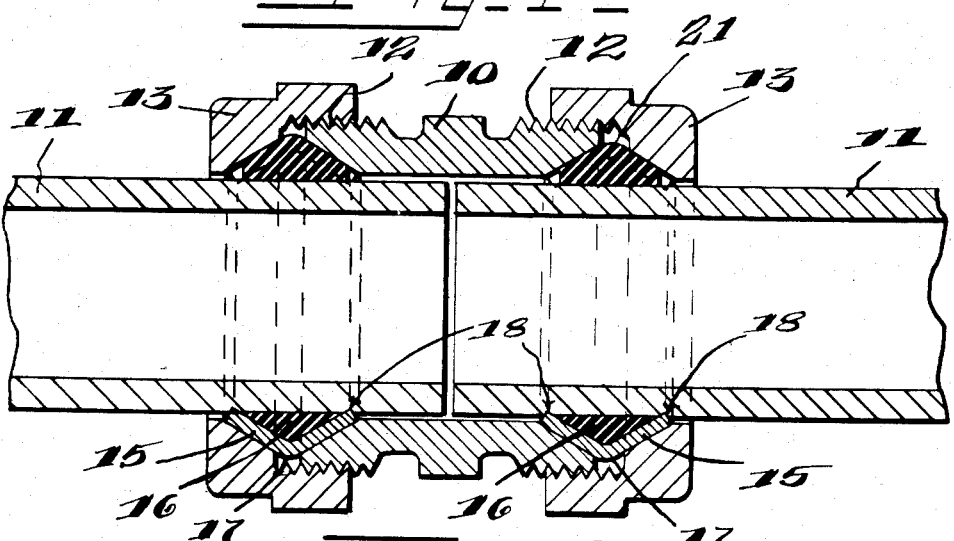
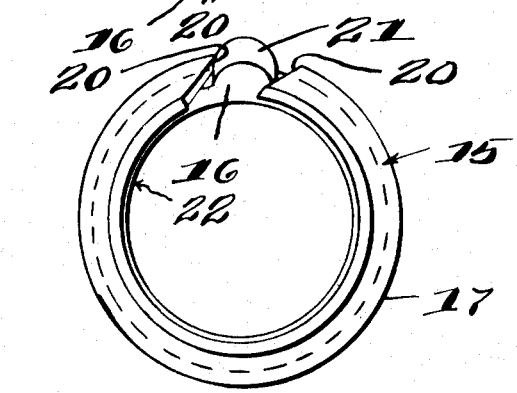
INVENTOR.
Walter O. White
BY Bodell & Thompson.
ATTORNEYS.

Patented June 30, 1942

2,288,506

UNITED STATES PATENT OFFICE 2,288,506

WATERTIGHT THREADLESS CONNECTOR

Walter O. White, Salina, N. Y., assignor to Crouse-Hinds Company, Syracuse, N. Y., a corporation of New York Application August 30, 1940, Serial No. 354,861

1 Claim. (Cl. 285—166)

This invention relates to threadless connectors employed to connect unthreaded ends of conduits or pipes, or to connect the unthreaded end of a conduit or pipe to a fitting such as an outlet box. Heretofore, any attempt to make such a threadless connector water tight resulted in a complicated and costly structure which prevented the general use of such a connector and limited the use thereof to installations where it was not possible to use any other form of connection.

The invention has as an object a particularly simple and economical construction operable to engage the conduit in water tight relation.

The invention has as a further object a connector of the type referred to employing a resilient or compressible gasket comprising part of the contractile member of the connector, whereby there are no additional parts to be separately handled in the use of the connector.

The invention consists in the novel features and in the combinations and constructions hereinafter set forth and claimed.

In describing this invention, reference is had to the accompanying drawing in which like characters designate corresponding parts in all the views.

Figure 1 is a side elevational view of one form of connector embodying my invention.

Figure 2 is a lengthwise sectional view of the structure shown in Figure 1.

Figure 3 is a plan view of the contractile member of the connector.

Figure 4 is a side elevational view of the contractile member.

Figure 5 is a side elevational view of the gasket or sealing member.

The embodiment of the invention shown is employed to connect the ends of two conduits or pipes and consists of a cylindrical body 10 provided with an axially extending bore to receive the ends of the conduits 11. Each end of the body is threaded externally as at 12 to receive compression nuts 13.

The connector further includes a contractile member comprising a split contractile ring 15 and an annular sealing member 16. The ring 15 is concave or V shaped in cross section, with the apex 17 of the formation spaced apart from the periphery of the conduit 11 and with the side edges of the ring engaging the periphery of the conduit as at 18.

The ring 15 is formed of steel, or other relatively hard metal, and is arranged within the nut 13. The bore at each end of the body is chamfered or tapered at an angle substantially complemental to the inclination of the side walls of the ring 15, and the bore of the nut is formed with a complemental taper. It will be apparent that when the nut 13 is threaded onto the body, the inclined surfaces of the body and nut cause the ring 15 to contract about the conduit 11 and the edges of the ring to bite into the periphery of the conduit. This operation firmly secures the end of the conduit into the connector and also forms a good electrical connection between the connector and the conduit inasmuch as the edges of the ring bite through any enamel or other coating with which the conduit may be provided.

The annular member 16 is formed of readily compressible material such as rubber, or oil proof rubber like material. The periphery of the member 16 being shaped complemental to the concavity of the ring 15 and is accordingly retained therein against displacement.

The ends 20 of the ring 15 are normally spaced apart as indicated in Figures 3 and 4, and the sealing member 16 is formed with a peripheral projection 21 arranged between the ends 20 of the ring. The inner diameter of the sealing member 16 is considerably less than the normal diameter of the ring 15, as indicated at 22, Figure 4, the diameter of the sealing member 16 being such as to permit it to be readily applied to the end of the conduit while frictionally engaging the same.

When the nut 13 is threaded upon the body, the ring 15 is contracted into engagement with the periphery of the conduit and the annular member 16 compressed between the conduit and the ring 15 causing the sealing member 16 to intimately engage the surface of the conduit in water tight relation throughout the circumference thereof regardless of any imperfections in the surface of the conduit. At the same time the sealing ring 15 is pressed into water tight relation throughout its length with the chamfered end of the body. During this contraction of the ring 15 and the sealing member 16, the material in the projection 21 is squeezed or forced radially outwardly into engagement with the end of the body whereby the conduit is effectively sealed in water tight relation to the body.

What I claim is:

A water tight threadless connector for conduits and the like comprising a body formed with an aperture to receive the end of the conduit, a nut threading on the body and being formed with a conduit receiving bore, a metallic split contractile ring arranged within the nut, said ring being V shaped in cross section with the edges of the ring engaging the periphery of the conduit upon contraction of the ring, an annular packing member formed of rubber arranged within said ring and having a cross sectional form complemental to said ring and being formed with a radially extending projection arranged between the ends of said contractile ring, and said nut being cooperable with the body to contract said ring and annular member on the conduit.

WALTER O. WHITE.